United States Patent
Salonidis et al.

(10) Patent No.: US 9,294,942 B2
(45) Date of Patent: Mar. 22, 2016

(54) METHOD AND PROCESSING DEVICE FOR OPTIMAL INTERFERENCE ESTIMATION AND SCHEDULING IN A MULTI-HOP WIRELESS NETWORK WITH CENTRALIZED CONTROL

(75) Inventors: Theodoros Salonidis, New York, NY (US); Henrik Lundgren, Le Plessis Robinson (FR); Pascal Le Guyadec, Saint Cloud (FR); Rafael Laufer, Los Angeles, CA (US)

(73) Assignee: Thomson Licensing, Issy-les-Moulineaux (FR)

( * ) Notice: Subject to any disclaimer, the term of this patent is extended or adjusted under 35 U.S.C. 154(b) by 233 days.

(21) Appl. No.: 13/976,375

(22) PCT Filed: Dec. 14, 2011

(86) PCT No.: PCT/EP2011/072780
§ 371 (c)(1),
(2), (4) Date: Jun. 26, 2013

(87) PCT Pub. No.: WO2012/089509
PCT Pub. Date: Jul. 5, 2012

(65) Prior Publication Data
US 2013/0272115 A1 Oct. 17, 2013

(30) Foreign Application Priority Data

Dec. 28, 2010 (EP) .................................... 10306533
Feb. 9, 2011 (EP) .................................... 11305128

(51) Int. Cl.
*H04W 24/04* (2009.01)
*H04W 28/18* (2009.01)
*H04W 72/12* (2009.01)

(52) U.S. Cl.
CPC .............. *H04W 24/04* (2013.01); *H04W 28/18* (2013.01); *H04W 72/1226* (2013.01)

(58) Field of Classification Search
CPC .. H04W 24/04; H04W 28/18; H04W 72/1226
USPC .................................................. 370/216, 225
See application file for complete search history.

(56) References Cited

U.S. PATENT DOCUMENTS 6,414,955 B1    7/2002   Clare et al.
7,469,143 B2   12/2008   Jain et al.
(Continued)

FOREIGN PATENT DOCUMENTS

KR       10-0877410 B1      1/2009

OTHER PUBLICATIONS

N. Ahmed et al: "SMARTA: A Self-Managing Architecture for Thin Access Points", CONEXT 2006; Dec. 4-7, 2006.
(Continued)

*Primary Examiner* — Chi H Pham
*Assistant Examiner* — Robert Lopata
(74) *Attorney, Agent, or Firm* — Myers Wolin LLC (57) ABSTRACT

A processing device equips a controller that is intended for providing data transmission schedules into multi-slot frames, based on a conflict graph representative of wireless links between nodes that interfere when transmitting simultaneously on a same radio channel, for nodes linked therebetween and belonging to a multi-hop wireless network using a MAC protocol supporting a slotted access. This processing device comprises a processing means arranged, during each frame, for updating the conflict graph from interference information provided by the nodes during this frame, and for refining this conflict graph from detection of hidden interferer nodes based on detected failures of data transmissions of the links between these nodes during at least the previous frame.

28 Claims, 2 Drawing Sheets

(56) References Cited

U.S. PATENT DOCUMENTS

| | | | |
|---|---|---|---|
| 7,676,236 B2 | 3/2010 | Nanda et al. | |
| 7,773,558 B2 | 8/2010 | Cho et al. | |
| 7,822,382 B2 | 10/2010 | Kang et al. | |
| 2005/0075104 A1* | 4/2005 | Jain et al. | 455/423 |
| 2007/0110102 A1* | 5/2007 | Yagyuu et al. | 370/470 |
| 2007/0153702 A1* | 7/2007 | Khan Alicherry et al. | 370/252 |
| 2008/0019374 A1* | 1/2008 | Lee et al. | 370/395.4 |
| 2008/0130565 A1* | 6/2008 | Jeong et al. | 370/329 |
| 2008/0151821 A1* | 6/2008 | Cho et al. | 370/329 |
| 2008/0274746 A1 | 11/2008 | Lin et al. | |
| 2008/0297413 A1 | 12/2008 | Kokku | |
| 2009/0003260 A1 | 1/2009 | Guo et al. | |
| 2009/0080377 A1* | 3/2009 | Ganguly et al. | 370/329 |
| 2009/0175238 A1* | 7/2009 | Jetcheva et al. | 370/329 |
| 2009/0180431 A1* | 7/2009 | Sengupta et al. | 370/329 |
| 2010/0080183 A1* | 4/2010 | Mishra et al. | 370/329 |
| 2010/0189005 A1* | 7/2010 | Bertani et al. | 370/252 |
| 2010/0322141 A1* | 12/2010 | Liu et al. | 370/315 |
| 2011/0222506 A1* | 9/2011 | Szymanksi | 370/330 |
| 2011/0292898 A1* | 12/2011 | Wu et al. | 370/329 |
| 2012/0163199 A1* | 6/2012 | Marbach et al. | 370/252 |

OTHER PUBLICATIONS

Bhaskaran Raman et al: "SIR-based interference-maps for TDMA-based outdoor mesh network", 2010 17th IEEE Workshop, May 5, 2010, pp. 1-6.

Search Report Dated Mar. 20, 2012.
Ahmed et al., "Online Estimation of RF Interference", ACM CoNEXT 2008, Madrid, Spain, Dec. 10-12, 2008.
Kashyap et al., "A Measurement-Based Approach to Modeling Link Capacity in 802.11-Based Wireless Networks", MobiCom'07, Montréal, Québec, Canada, Sep. 9-14, 2007.
Liu et al., "DIRC: Increasing Indoor Wireless Capacity Using Directional Antennas", SIGCOMM'09, Barcelona, Spain, Aug. 17-21, 2009.
Mahajan et al., "Analyzing the MAC-level Behavior of Wireless Networks in the Wild", SIGCOMM'06, Pisa, Italy, Sep. 11-15, 2006.
Mahmood et al., "Incremental Routing and Scheduling in Wireless Grids", Department of Computing Science, University of Alberta, Edmonton, Canada, 978-1-4244-4148-8/09/$25.00, IEEE Copyright 2009.
Padhye et al., "Estimation of Link Interference in Static Multi-hop Wireless Networks", 2005.
Qiu et al., "A General Model of Wireless Interference", MobiCom'07, Montréal, Québec, Canada, Sep. 9-14, 2007.
Shao et al., "Cross-layer Optimization for Wireless Networks with Deterministic Channel Models", 978-1-4244-5837-0/10/$26.00, IEEE Copyright 2010.
Vutukuru et al., "Harnessing Exposed Terminals in Wireless Networks", MIT Computer Science and Artificial Intelligence Laboratory, 2008.

\* cited by examiner

METHOD AND PROCESSING DEVICE FOR OPTIMAL INTERFERENCE ESTIMATION AND SCHEDULING IN A MULTI-HOP WIRELESS NETWORK WITH CENTRALIZED CONTROL

This application claims the benefit under 35 US.C. §365 of International Application PCT/EP2011/072780, filed Dec. 14, 2011, which was published in accordance with PCI Article 21(2) on Jul. 5, 2012 in English and which claims the benefit of European patent application No. 10306533.0, filed on Dec. 28, 2010, and European patent application 11305128.8, filed on Feb. 9, 2011.

TECHNICAL FIELD

The present invention relates to wireless networks, and more precisely to wireless networks, hereafter called "centralized wireless networks" and that comprise a central controller for optimizing transmissions.

So, the invention is applicable, for instance, to any type of wireless local area network (or WLAN-IEEE 802.11), and notably to home wireless networks comprising multiple access points and a home gateway acting as a central controller.

BACKGROUND OF THE INVENTION

As it is known by the man skilled in the art most of the existing centralized wireless networks operate in a single-hop fashion. There exist also few wireless networks operating in a multi-hop fashion, but they implement distributed scheduling mechanisms and distributed MAC protocols that are based on random access and that have sub-optimal interference estimation capabilities. There may be interference between two nodes when these nodes transmit simultaneously at certain data rates on the same radio channel.

It is recalled that a multi-hop wireless network is a network comprising a wireless backbone that is formed by wireless mesh access points (MAPs) interconnected with wireless links, each MAP being potentially capable of serving users (or client) wireless communication equipments. In contrast, a single-hop wireless network is a network comprising, notably, base stations or access points (or APs—or any equivalent radio network equipments) interconnected with a wired network backbone and serving user (or client) wireless communication equipments. Thus, a single-hop wireless network is a special case of a multi-hop wireless network.

In a centralized multi-hop wireless network it is important to be able to accurately estimate interference and to use this interference information to perform optimal scheduling decisions for the wireless backbone and wireless users. In centralized single-hop wireless networks it is also crucial to perform optimal scheduling decisions, but only the wireless interference among users of different access points must be preferably taken into account. However, this is not always the case. Indeed, in cellular centralized TDMA wireless systems, each base station schedules independently its user wireless communication equipments and the interference among them is not taken into account. In 802.11-based centralized wireless systems for enterprise networks, there also exist some approaches which try to take into account interference among user wireless communication equipments of different access points.

Several techniques may be used for scheduling transmissions in centralized multi-hop wireless networks. Most of these techniques use scheduling algorithms while assuming that the interference patterns are known. For instance, given a conflict graph representing conflict relationships between links, it can be shown that a maximum-weight independent set computation (or MWIS) on this conflict graph enables the network to achieve a maximum throughput. Unfortunately this optimal scheduling mechanism assumes that the conflict graph is static and already given and accurately represents interference relationships in the network, which is often inexact or even false. Indeed, in practice, it is first necessary to measure interference between nodes and then to adjust the interference model to the current conditions.

Several solutions may be implemented to measure link interferences. Pure measurement solutions are the most accurate, but they require an exponential number of measurements in the network. Some other solutions use interference models based on hop count or Received Signal Strength (or RSS) and Signal-to-Noise Ratio (or SNR) information or else Signal-to-Interference Ratio (or SIR) information. The last one (with SIR information) is the most accurate (a group of transmissions is considered as successful if all the concerned receivers operate with a SIR greater than a SIR threshold). While the SIR model has been used in theoretical studies and scheduling mechanisms, it has not yet been implemented in real centralized multi-hop wireless networks. Indeed, in these real multi-hop wireless networks measurement limitations prevent nodes from measuring all signals and therefore there exist hidden interferers that induce link failures and serious performance issues (such as severe packet loss and/or complete failure of wireless links).

Several interference estimation mechanisms have been proposed for WLAN networks. They are notably described in the following documents:

"DIRC: Increasing Indoor Wireless Capacity Using Directional Antennas", X. Liu et al., ACM Sigcomm, Barcelona, Spain, August 2009, "Measurement-based Approach to Modeling Link Capacity in 802.11-based Wireless networks", A. Kashyap et al., Proc. ACM MobiCom, Montreal, Canada, October 2007, "Online Estimation of RF Interference", N. Ahmed et al., ACM CoNEXT, Madrid, Spain, December 2008, "Analyzing the mac-level behavior of wireless networks in the wild", R. Mahajan et al., Proc. ACM SIGCOMM, Pisa, Italy, August 2006, "A general model of wireless interference", L. Qiu et al., Proc. ACM MobiCom, Montreal, Canada, October 2007, "Estimation of Link Interference in Static Multi-hop Wireless Networks", J. Padhye et al., Proc. ACM Internet Measurement Conference (IMC), Berkeley, Calif., USA, October 2005, "Harnessing exposed terminals in wireless networks", M. Vutukuru et al., Proc. NSDI, San Francisco, Calif., April 2008.

These mechanisms vary in accuracy and may be classified as online, offline, passive, or active. Offline techniques (such as the ones proposed by R. Mahajan et al. and J. Padhye et al.) are not applicable to scheduling algorithms which require real-time (online) interference estimation. Online techniques (such as the ones proposed by X. Liu et al. and N. Ahmed et al.) are not applicable to multi-hop wireless networks; rather they are restricted to computing conflict graphs for single-hop downlink traffic in WLANs. Moreover these online techniques do not allow to compute an optimal schedule and do not support detection of hidden interferers and refinement of conflict graph. A technique such as the one proposed by L. Qiu can be implemented into multi-hop wireless networks. It uses existing RSS-based interference mechanisms for Packet Delivery Ratio (or PDR) prediction that are based on offline calibration of SNR thresholds at different locations under no interference. However, one may show that, under interference, SNR calibration techniques can be highly inaccurate and then complementary mechanisms are needed. Passive techniques (such as the one proposed by M. Vutukuru et al.) disable carrier sense whenever possible but cannot detect hidden interferers.

SUMMARY OF THE INVENTION

Till now, interference estimation and scheduling of transmissions in a centralized multi-hop wireless network have been considered separately. On one hand, existing practical measurement-based interference estimation methods used for distributed CSMA 802.11 networks cannot detect hidden interferers and are not integrated with optimal scheduling mechanisms. On the other hand, existing optimal scheduling mechanisms (such as the backpressure algorithm) assume that the interference relationships are known in advance and are not integrated with interference estimation mechanisms in dynamic environments.

So, an objective of the invention is to allow an optimal scheduling of data transmissions in a multi-hop wireless network (possibly supporting transmissions at multiple data rates), where transmissions are arbitrated by a central controller, by means of interference estimations working at a fast frame-level time scale and feedback information measurements relative to the data transmissions and allowing detection of hidden interferers (preferably by means of an adaptive mechanism).

More precisely, the invention provides a processing device, intended to equip a central controller that is intended to provide an optimal multi-slot data transmission schedule for each multi-slot frame, based on a conflict graph that represents wireless links between nodes, that interfere when transmitting simultaneously at certain data rates on the same radio channel. These nodes belong to a multi-hop wireless network using a MAC protocol supporting transmissions that are organized in multi-slot frames (that are repeated periodically).

This processing device comprises a processing means that is arranged, during each frame k, for updating the conflict graph from interference information provided by the nodes during this frame k, and for refining this conflict graph from detection of hidden interferer nodes based on detected failures of data transmissions of the links between these nodes during at least the previous frame k−1.

The processing device according to the invention may include additional characteristics considered separately or combined, and notably:

its processing means may be arranged for updating a conflict graph comprising a set of vertices, where each vertex represents a link between two nodes transmitting at a given data rate (at the physical layer), and a set of edges, where each edge between two vertices represents two links corresponding to these vertices that interfere when they transmit simultaneously on the same channel at the corresponding data rates (at the physical layer);

each interference information may be a Received Signal Strength measurement (or RSS);

its processing means may be arranged for refining the conflict graph from detection of hidden interferer nodes based on data transmission failures represented by packet delivery ratios (or PDRs) of links between nodes;

its processing means may be arranged, during each frame k, for updating a reachability graph, comprising of a set of vertices, where each vertex corresponds to a network node and each directional edge from vertex i to vertex j indicates that vertex j is within transmission range from vertex i, from at least the interference information provided by the nodes during this frame k, and for detecting these hidden interferer nodes among nodes that are at least two-hops away from a receiver node in the reachability graph;

its processing means may be arranged, during each frame k, for updating the reachability graph by computing directional edges, linking a first node to a second node when this first node is able to receive chosen packets broadcast by this second node during this frame k, from at least the interference information transmitted by the nodes during this frame k;

its processing means may be arranged, during each frame k, for detecting the hidden interferer nodes from at least feedback information relative to the data transmissions and transmitted by the nodes during at least a previous frame k−1;

its processing means may be arranged for considering as a failing link each link that is associated to a packet delivery ratio equal to zero, and for constituting a set with these failing links;

its processing means may be arranged for determining for the set of failing links for which a data transmission failure has been detected, a set of hidden interferer nodes that represent transmitter nodes which are at least at a chosen number h_ij of hops away from the receiver node of each failing link in the reachability graph, and then adding an edge into this conflict graph between each vertex corresponding to a failing link and the vertices whose corresponding links have as transmitter nodes the nodes in the determined set of hidden interferer nodes;

its processing means may be arranged for considering for each failing link the set Succ_ij(k−1) of all the link transmission sets of frame k−1 where this link succeeded and the set Fail_ij(k−1) of all the link transmission sets of frame k−1 where this link failed, then for initializing the set of hidden interferer nodes for this failing link by adding only the transmitter nodes of the links that appear in this set Fail_ij(k−1) and do not appear in this set Succ_ij(k−1);

its processing means may be arranged for forming a set of hidden interferer nodes Hij(k−1) by selecting from the initial set of hidden interferer nodes the ones that are two-hops away from receiver node of a failing link in the reachability graph, then for adding an edge into the conflict graph between the vertex that corresponds to this failing link and the vertices that correspond to links that have as transmitter nodes the nodes in this set of hidden interferer nodes Hij(k−1);

its processing means may be arranged, if said failing link that failed in frame k−1 fails again in the next frame k, for forming a set of hidden interferer nodes Hij(k) for frame k by selecting from the initial set of hidden interferer nodes the ones that are three-hops away from receiver node of this failing link in the reachability graph, then for updating the conflict graph by adding an edge between the vertex that corresponds to this failing link and the vertices that correspond to links that have as transmitter nodes the nodes in the set of hidden interferer nodes Hij(k), and if this failing link continues failing in subsequent frames, for repeating the forming of a set of hidden interferer nodes Hij(k) and the updating of the conflict graph with an increasing number of hops away from receiver node of this failing link in the reachability graph, until this failing link succeeds in a subsequent frame;

it may further comprise a scheduling means arranged, during each frame k, for computing a data transmission schedule, defining slot(s) of this frame k during which each node is authorized to transmit its data, from the updated and refined conflict graph, each link comprising a hidden interferer node acting as a transmitter node and interfering with another link being scheduled at a different time slot than this last link.

The invention also provides a central controller, intended for providing data transmission schedules into multi-slot frames for nodes linked therebetween and belonging to a multi-hop wireless network using a MAC protocol supporting a slotted access, and comprising a processing device such as the one above introduced.

The invention also provides a network equipment, defining a node for a multi-hop wireless network using a MAC protocol supporting a slotted access, and arranged, for each multi-slot frame comprising a measurement phase, a computation phase and a data transmission phase, for measuring a chosen interference information during the measurement phase, for measuring a feedback information representative of failures of data transmissions between the nodes during the data transmission phase, and for transmitting the chosen interference information and measured feedback information obtained during the previous frame k−1, during the measurement phase of frame k.

The invention also provides a method intended for transmitting data in a multi-hop wireless network using a MAC protocol supporting a slotted access and comprising nodes linked therebetween and a central controller intended for providing these nodes with schedules for transmitting data into multi-slot frames, from a conflict graph representative of links between nodes that interfere when transmitting simultaneously on a same radio channel using certain data rates.

This method comprises the steps, for each frame k comprising a measurement phase, a computation phase and a data transmission phase, of:

i) measuring chosen interference information into each node and transmitting, from each node to the central controller, the measured chosen interference information and measured feedback information related to the data transmissions in a previous frame k−1, during the measurement phase of frame k, ii) updating the conflict graph from the transmitted interference information, and refining this updated conflict graph from detection of hidden interferer nodes based on detected failures of data transmissions of the links between the nodes deduced from feedback information measured during at least the previous frame k−1, then computing a data transmission schedule for the nodes and transmitting this computed data transmission schedule from the central controller to the nodes, during the computation phase, and iii) transmitting data between nodes during time slots associated to these nodes according to the computed data transmission schedule, and measuring, into each node, feedback information relative to the data transmissions, during the data transmission phase.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its definition, if need be.

The invention aims, notably, at offering a method, and an associated processing device D, intended for allowing network equipments (or nodes) Ni to transmit data with an optimal scheduling, in a multi-hop wireless network (possibly offering multi-rate) WN, where transmissions are arbitrated by a central controller CC.

The invention concerns any type of centralized multi-hop network supporting a slotted access (such as a slotted access MAC protocol), that operates with a multi-slot frame, and comprising nodes (or network equipments) Ni connected therebetween (through radio (or wireless) links) and a central controller CC for transmission scheduling.

More, in the following description it will be considered that the slotted access MAC protocol can be a Time Division Multiple Access (TDMA) protocol.

Figure 1:
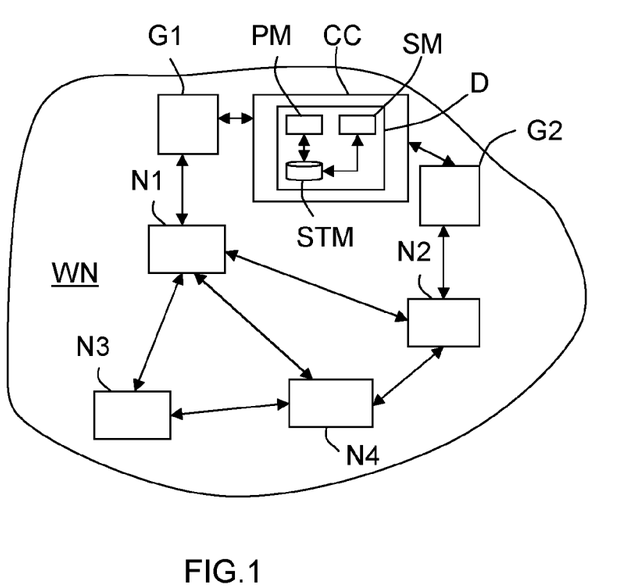
FIG. 1 schematically and functionally illustrates an example of wireless network comprising four wireless network equipments (or nodes) linked therebetween, two gateways connected to two wireless network equipments (or nodes) and to a central controller comprising an example of embodiment of a processing device according to the invention, and FIG. 2 schematically illustrates an example of updating and refining of a conflict graph over three successive frames k−1, k and k+1 based on the content of a reachability graph.

In the example illustrated in FIG. 1 the (centralized multi-hop wireless) network WN comprises a central controller CC and four network nodes Ni (i=1 to 4) whose transmissions are scheduled by the central controller CC. But the number of nodes Ni may be different from four, as long as it is at least equal to three.

In this example the network WN also comprises a wired infrastructure and two gateways G1 and G2. The gateways G1, G2 are connected to the wired infrastructure, to the central controller CC and to nodes N1 and N2 respectively, and may offer access to the Internet to nodes Ni. It is important to note that a gateway G1, G2 could be a node Nj.

In the following description it will be considered that the network WN is a home wireless network comprising multiple mobile access points (or MAPs), defining nodes Ni offering access to the network WN to user communication equipments (such as mobile phones, personal digital assistants (or PDAs), fixed computers or laptops), and a home gateway acting as the central controller CC.

More, in the following description it will be considered that the nodes Ni are equipped with a single radio interface tuned to the same frequency band. But the invention also applies to nodes equipped with a multi-radio interface. In this case, the interference estimation and the transmission schedules may be computed separately for each one of the radio channels.

According to the invention, each (multi-slot) frame k is divided in a measurement phase, a computation phase and a data transmission phase.

The measurement phase is intended for allowing each node Ni to test each one of its outgoing links (Ni,Nj). For instance, in the measurement phase of each frame k the nodes Ni may be sequentially scheduled to test their outgoing links (Ni,Nj) one after the other by transmitting chosen packets. When a node Ni transmits alone, all the other nodes Ni' (i'≠i) are in a receive mode.

The data transmission phase is intended for allowing each node Ni, that wants to transmit data (or payload), to carry out such a transmission during a time slot that has been allocated to him, and possibly to one or more other nodes Ni' that do not interfer with it, for the considered frame k. The data transmission phase consists of T time slots that are shared between nodes Ni. It is important to note that the same time slot of a frame k may be allocated to only one node or to several nodes that do not interfer. One of the goals of the invention is to allow optimization of the allocation of these time slots for each frame k.

The frames repeat periodically and may be numbered as integers k in increasing order over time. In the following description it will be considered that each frame k starts with a measurement phase which is followed by a computation phase which is followed by a data transmission phase. But, such an order of phases is not mandatory.

For instance, the network WN may support multiple data rates at the physical layer, hereafter named "PHY rates". In this case, at each time slot a node Ni may select a chosen single PHY rate for its packet transmissions.

The invention proposes, notably, to equip the (central) controller CC with a processing device D comprising at least a processing means (or module) PM.

Such a processing device D can be made of software modules, at least partly, or of electronic circuit(s) or hardware modules, or else of a combination of hardware and software modules (in this case the device D comprises also software interfaces allowing interworking between the hardware and software modules).

The processing means (or module) PM, of the processing device D, is arranged, during each frame k, for updating a conflict graph CG(V,E) from interference information that is provided by the nodes Ni during this frame k. This update of the conflict graph CG(V,E) is performed by the processing device D during the computation phase of each frame k.

A conflict graph CG(V,E) is made of data information that is representative of wireless links (Ni,Nj) between nodes Ni that interfere when transmitting simultaneously on a same radio channel.

This conflict graph CG(V,E) is built and maintained, frame after frame, by the processing device D. It may be stored in a storing means STM that may equip the processing device D, as illustrated in the FIG. 1, but which could be also located into the controller CC. This storing means STM may be of any type known by the man skilled in the art. So, it may be a memory or a database, possibly of the software type.

Preferably, each interference information is a Received Signal Strength (or RSS) measurement (or value) that is obtained by each node Ni during the measurement phase of each frame k. For instance, the nodes Ni may be sequentially scheduled to transmit alone chosen broadcast packets, preferably at the lowest supported PHY rate in the case where the network works in a multi-rate fashion. When a node Ni transmits alone, all the other nodes Ni' (i'≠i) are in a receive mode. Thus, when the measurement phase of a frame k is finished, all the nodes Ni have transmitted their broadcast packets and each node Ni may record a RSS value for every other node Ni' that is within its transmission range. Then, each node Ni may send to the controller CC at least the RSS values they have just recorded during the current measurement phase of the considered frame k.

For instance, this conflict graph CG(V,E) comprises a set V of vertices, where each vertex represents a link (Ni,Nj) between two nodes Ni and Nj transmitting at a given data rate, and a set E of edges, where each edge between two vertices represents two links corresponding to these vertices that interfere when they transmit simultaneously on the same channel at the corresponding data rates. In the following description a "link transmission set" designates a set of links (or vertices) that are allowed to transmit simultaneously and that are represented by a vertex independent set in the conflict graph CG(V,E).

For instance, the processing means PM may create a set of vertices V and a set of edges E in the conflict graph CG(V,E) using a RSS criterion. For instance, one may use the following RSS criterion: if one lets RSSNiNj be the RSS value of signal transmitted by node Ni and received by node Nj, recorded during the measurement phase of the present frame k, then if node Nj has not received a broadcast packet from node Ni during this frame k (i.e. if RSSNiNj is smaller than a chosen threshold), node Ni is considered outside the transmission range of node Nj.

In the case where the network WN works in a multi-rate fashion, for each PHY rate R supported by this network WN, the processing means PM creates a vertex labelled vn=(Ni, Nj,R) in the conflict graph CG(V,E) if RSSNiNj exceeds a receive sensitivity threshold gamma_R of the receiver node Nj at PHY rate R. So, a vertex vn=(Ni,Nj,R) corresponds to a link (Ni,Nj) which can support transmissions from node Ni to node Nj at PHY rate R when link (Ni,Nj) transmits alone in the network WN.

Then the processing means PM adds edges to the conflict graph CG(V,E). According to the invention, there exists an edge between two vertices vn and vn' of the conflict graph CG(V,E) when the corresponding links of these vertices vn and vn' interfere and therefore should not be scheduled to transmit at the same time. More precisely, one may add an edge between a pair of vertices v1=(s1,r1,R1) and v2=(s2,r2, R2), where s1 and s2 are two different transmitter nodes and r1 and r2 are two different receiver nodes, if the vertices v1 and v2 share a common node and/or if the signal to interference ratio (or SIR) at any of the two receivers r1 and r2 (denoted SIRs1r1(s2) and SIRs2r (s1)) does not exceed a chosen SIR threshold δ_R1, δ_R2 of the corresponding PHY rate R1 or R2.

To create the edges, one may considers the three following conditions:
nodes s1, r1, s2, and r2 are different,
SIRs1r1(s2)=RSSs1r1/(N_r1+RSSs2r1)>δ_R1,
SIRs2r2(s1)=RSSs2r2/(N_r2+RSSs1r2)>δ_R2.
where N_r1 and N_r2, are predetermined noise thresholds specific to the wireless hardware of the receivers r1 and r2, and SIRxy(z) denotes the SIR from node x to node y due to interfering node z.

If at least one of the three above conditions is violated then the two vertices v1=(s1,r1,R1) and v2=(s2,r2,R2) are considered as interfering and an edge between these vertices v1 and v2 is added in the conflict graph CG(V,E).

The processing means (or module) PM is also arranged, during each frame k, for refining the conflict graph CG(V,E) from detection of hidden interferer nodes based on detected failures of data transmissions between the nodes Ni during at least the previous frame k−1. The hidden interferer nodes are interfering nodes which can not be detected directly by the controller CC by means of the information obtained by the nodes Ni during the measurement phases, but which may be detected from failures of data transmissions of the links during (data transmission phase(s) of) previous frame(s).

The detection of hidden interferer nodes is based on data transmission failures that are represented by feedback information which is obtained by each node Ni during the transmission phase of each frame k and which is preferably made of packet delivery ratios (or PDRs) of links between nodes Ni.

More precisely, during the transmission phase of each frame k, each node Ni may measure the packet delivery ratio PDRNiNj of each of its outgoing links (Ni,Nj), for instance by using a moving average of length K (network parameter). Still more precisely, the PDR of link (Ni,Nj) may be measured as the fraction of successful transmissions on link (Ni,Nj) over the number of transmission slots allocated to this link (Ni,Nj) over a window of length K.

In addition to the PDR measurement, during the transmission phase of each frame k each node Ni may further detect whether a link (Ni,Nj) has failed or not during the transmission phase of the considered frame k. The detection may be performed by detecting Xij consecutive failed transmissions, where Xij is a network parameter which can be the MAC protocol retransmission limit, for instance. Upon failure detection, node Ni stops transmitting on link (Ni,Nj) and may assign to the link a PDRNiNj=0.

Thus at the end of the data transmission phase of a frame k−1, each link (Ni,Nj) has either a non-zero PDRNiNj (computed by the moving average), or a PDRNiNj equal to 0 which denotes that the link (Ni,Nj) failed during this frame k−1. This feedback information (PDRNiNj) can be sent during the measurement phase of the next frame k, by the nodes Ni to the controller CC along with the RSS values obtained during that measurement phase.

The refining of the conflict graph CG(V,E) is performed by the processing means PM during the computation phase of each frame k, after its update.

As mentioned above, to refine the conflict graph CG(V,E) the processing means PM must identify hidden interferer nodes (hereafter named hidden interferers). It may proceed as follows, for instance.

If one lets F(k−1) be the set of (failing) links which failed during the transmission phase of frame k−1 (determined from PDR measurements), then if this set is non-empty, the processing means PM may carry out the following actions.

For each link corresponding to the vertex v1=(Ni, Nj,R1) in the set F(k−1), one may consider the set Sij(k−1) of link transmission sets where this link was scheduled during the previous frame k−1. If one lets Succ_ij(k−1) be the subset of Sij(k−1) where all the links were successful and Fail_ij(k−1) be the subset of Sij(k−1) where at least one link failed in frame k−1, then there exists s hidden interferers and the link transmission sets Sij(k−1) must be broken by adding edges between the vertex v1=(Ni,Nj,R1) corresponding to the link (Ni,Nj) and the vertices of some other links in the conflict graph CG(V,E).

The set of hidden interferers Hij(k) of link (Ni,Nj,R1) can be computed as follows.

Firstly one may implement a filtering stage. In this filtering stage all links belonging to the link transmission sets of set Succ_ij(k−1) are considered non-interfering to a link corresponding to a vertex v1=(Ni,Nj,R1), while at least some of the links belonging to the subsets Fail_ij(k−1) are hidden interferers. Thus the subset of hidden interferers Hij(k) of a link corresponding to a vertex v1=(Ni,Nj,R1) is initialized by adding only the links that appear in subset Fail_ij(k−1) but that do not appear in subset Succ_ij(k−1).

The subset Fail_ij(k−1) contains all link transmission sets where link (Ni,Nj) failed during frame k−1. So, these sets contain links whose transmitters are hidden interferer nodes of link (Ni,Nj). Thus the initial set of candidate hidden interferer nodes is chosen as the nodes who are transmitters of links that appear in the subset Fail_ij(k−1) and not in the subset Succ_ij(k−1). This allows to narrow down the search for hidden interferer nodes.

Given the initial set of candidate hidden interferer nodes, some of these nodes are spaced by 2 hops, 3 hops, or more in a reachability graph RG(N,E) generated by the controller CC. So, the detection mechanism may consider first the 2-hop nodes as hidden interferer nodes, and then if the link fails again in the next frame, it considers the 3-hop nodes as hidden interferer nodes, and so on, until all the hidden interferer nodes are found.

Then the variable h_ij of each link, that denotes the number of hops that have been considered, may be updated as follows.

A hop h is defined between two neighbors Ni and Nj. These neighbors may be defined in a reachability graph RG(N,E) which is preferably built and maintained, frame after frame, by the processing means PM.

This reachability graph RG(N,E) may comprise a set of N nodes that are linked therebetween, and directional edges, where each directional edge defined from node Ni to node Nj indicates that node Ni is reachable from node Nj. Reachability is determined by reception or not by node Nj of chosen packets that are broadcast by node Ni during the measurement phase of each frame k. Hidden interferers of a link (Ni,Nj) are identified among nodes that are two-hops or more away from a receiver node Nj in the reachability graph RG(N,E). As it will be explained below, once these hidden interferers are identified, the links where they act as transmitter nodes will be all scheduled at a different time slot than link (Ni,Nj).

It is important to note that considering all the nodes beyond two hops as hidden interferers is not really efficient. Indeed, this might waste simultaneous transmission opportunities between link (Ni,Nj) and nodes that are located too far away in the reachability graph to cause interference. In order to avoid this inefficiency, the hidden interference detection first considers the two-hop neighbors as hidden interferers and allows the link to transmit simultaneously (i.e. in the same time slot) with nodes more than three hops in the next frame. If the link corresponding to the vertex v1=(Ni,Nj,R1), which failed at frame k−1, was successful in frame k−2, the variable h_ij of this link may be set to 2 at frame k. So, and as mentioned above, one preferably considers only hidden interferers among the 2-hop neighbors that each node Ni is able to reach. Otherwise, if the link corresponding to the vertex v1=(Ni,Nj,R1) failed both at frames k−2 and k−1, the variable h_ij of this link is increased by one.

Then the processing means PM searches set Hij(k) for a link corresponding to a vertex v2=(s2,r2,R2), whose transmitter node s2 is at h_ij hops away from a receiver node Nj in the reachability graph RG(N,E). If no such vertex v2 is found, then h_ij is increased by one and the search is repeated. h_ij is increased until at least one such link is found.

For each link corresponding to a vertex v2=(s2,r2,R2), found by the above step, an edge is added in the conflict graph CG(V,E) between vertex v1=(Ni,Nj,R1) and all vertices having node s2 as a transmitter, including the vertex v2=(s2,r2,R2). This action essentially classifies node s2 as a hidden interferer of receiver node Nj and prevents the link corresponding to the vertex v1=(Ni,Nj,R1) to be comprised in a link transmission set with any link having s2 as transmitter.

When the processing means PM has added all the edges into the conflict graph CG(V,E) for frame k, it owns a new updated and refined conflict graph CG(V,E) that it may use for computing a new data transmission schedule S(k)= (S_1(k), . . . , S_t(k), . . . , S_T(k)) defining an optimal set of non-interfering links for each of the T time slots of the data transmission phase of the current frame k. This schedule computation can be performed during the computation phase of each frame k by a scheduling means (or module) SM, which may be part of the processing device (as illustrated in the FIG. 1). It is important to note that, in a variant, the scheduling means (or module) SM could be a part of the controller CC.

Each data transmission schedule S(k) of a frame k consists of T link transmission sets S_t(k). Each link transmission set S_t(k) consists of links whose corresponding vertices in the new updated and refined conflict graph CG(V,E) form an independent set.

Various algorithms can be used to compute the link transmission set S_t(k) at each slot. The simplest scheduling algorithm may compute a maximal independent link transmission set. An optimal (and most complex) algorithm may compute a maximum weight independent set (MWIS) in the conflict graph CG(V,E), where the weights of each link corresponding to a vertex (Ni,Nj,R) may be computed as follow: w_ijR=Q_ij×PDRNi,Nj×R, where Q_ij is the amount of data in a memory queue dedicated to link (Ni,Nj), PDRNi,Nj is the fraction of successfully transmitted packets during each frame, and R is the PHY rate used for the transmissions of the link corresponding to the vertex (Ni,Nj,R).

Figure 2:
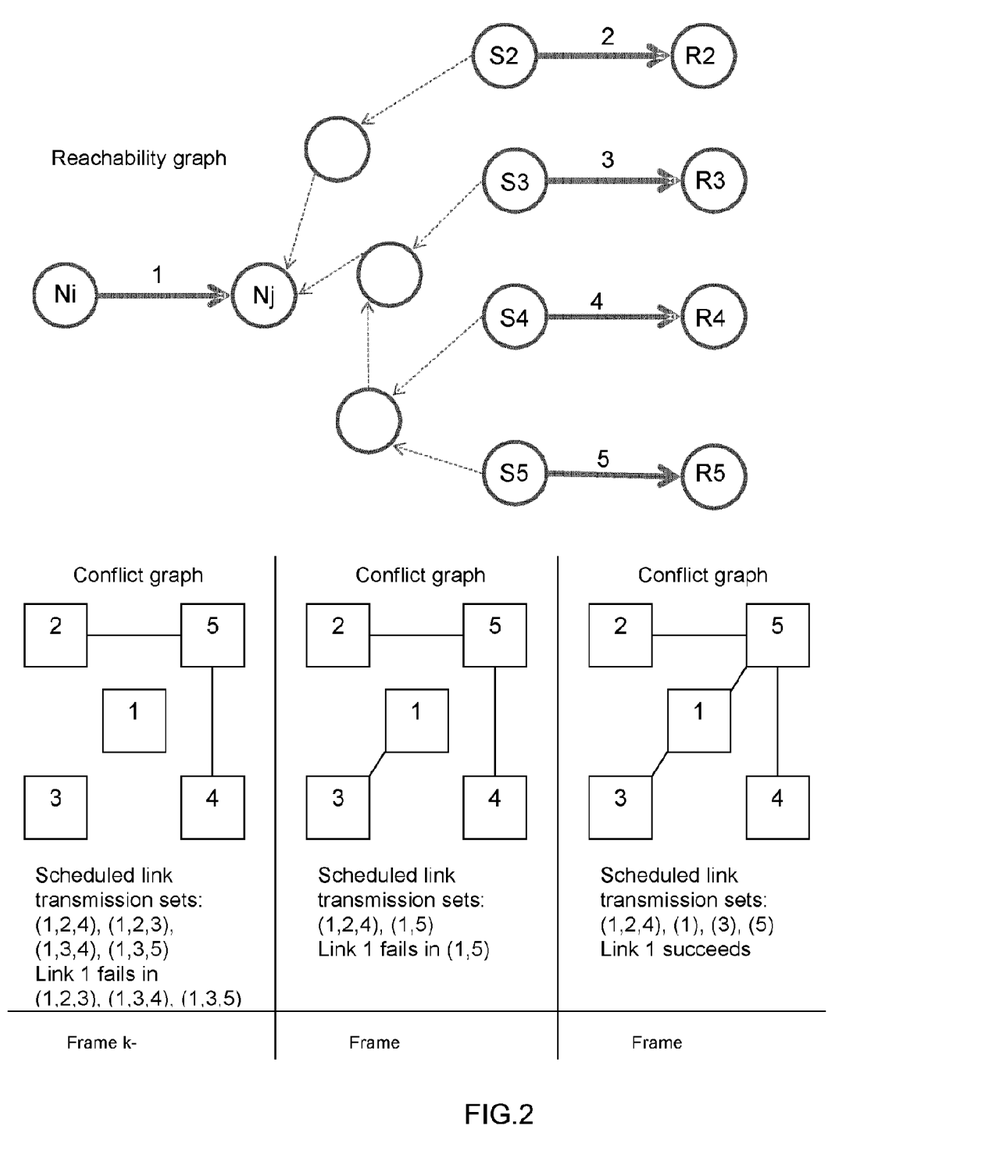

An example of updating and refining of a conflict graph CG(V,E) over three successive frames k−1, k and k+1 is illustrated in FIG. 2.

In the reachability graph RG(N,E) illustrated in FIG. 2, each circle with an inside reference designates a network node and each arrow associated with a number designates an oriented link between two nodes. In this example one considers that the reachability graph RG(N,E) is constant over frames k−1, k and k+1, in order to simplify the reasoning.

In each conflict graph CG(V,E) illustrated at the bottom of FIG. 2, each square box with an inside reference designates an oriented link and each edge between circles denotes that the two corresponding links cannot be part of the same link transmission set, i.e. only the independent sets of the conflict graph can form link transmission sets.

For instance, suppose that the link transmission sets (1,2,4), (1,2,3), (1,3,4) and (1,3,5) are scheduled in successive time slots of frame k−1, and that link 1 succeeded in the link transmission set (1,2,4) and failed in link transmission sets (1,2,3), (1,3,4) and (1,3,5), while all the other links succeeded in all transmission sets. Therefore the sets Succ_1(k−1) and Fail_1(k−1) for link 1 in frame k−1 are {(1,2,4)} and {(1,2,3), (1,3,4), (1,3,5)}, respectively.

Based on the sets Succ_1(k−1) and Fail_1(k−1), the initial set of hidden interferer nodes of link 1 are S3 and S5, which are the transmitters of links 3 and 5 which appear in Fail_1(k−1) but do not appear in Succ_1(k−1). From these two nodes, S3 is selected as hidden interferer by being two hops from node Nj (the receiver of link 1) in the reachability graph RG(N,E). Then the conflict graph CG(V,E) is updated by adding an edge between links 1 and 3 in the conflict graph CG(V,E). This action effectively does not allow links 1 and 3 to belong to the same link transmission sets in subsequent frames. At this step, one does not add an edge between links 1 and 5 in the conflict graph CG(V,E) because S5 is three hops from Nj in the reachability graph RG(N,E).

Then, suppose that the link transmission sets (1,2,4) and (1,5) are scheduled for frame k and that link 1 succeeded in the link transmission set (1,2,4) and failed in link transmission sets (1,5), while all the other links succeeded in all transmission sets. Therefore the sets Succ_1(k) and Fail_1(k) for link 1 in frame k are {(1,2,4)} and {(1,5)}, respectively. Based on the sets Succ_1(k) and Fail_1(k) the initial set of hidden interferer nodes of link 1 in frame k is S5, the transmitter of link 5 which is in Fail_1(k) but not in Succ_1(k). Node S5 is selected in the final set of hidden interferers by being three hops from node Nj (the receiver of link 1) in the reachability graph RG(N,E). Then the conflict graph is updated by adding an edge between links 1 and 3 in the conflict graph CG(V,E). This action effectively does not allow links 1 and 5 to belong to the same link transmission sets in subsequent frames.

Then, suppose that the link transmission sets (1,2,4), (1), (3) and (5) have been scheduled at frame k+1 and that all links in all transmission sets (1,2,4), (1), (3) and (5) succeeded. Link 1 having now succeeded, the conflict graph CG(V,E) is considered as refined at the end of frame k+1.

The invention can also be considered in terms of a data transmission method for a multi-hop wireless network WN using a MAC protocol supporting a slotted access and comprising nodes Ni linked therebetween and a central controller CC. Such a method may be implemented by means of a processing device D and nodes Ni such as the ones above described with reference to FIGS. 1 and 2. Therefore, only its main characteristics will be mentioned hereafter.

The method according to the invention comprises the steps, for each frame k comprising a measurement phase, a computation phase and a data transmission phase, of:

i) measuring chosen interference information into each node Ni and transmitting, from each node Ni to the central controller CC, this measured chosen interference information and measured feedback information obtained in a previous frame k−1, during the measurement phase of frame k, ii) updating a conflict graph CG(V,E) from the transmitted interference information, and refining this updated conflict graph CG(V,E) from detection of hidden interferer nodes based on detected failures of data transmissions of the links between the nodes Ni (deduced from feedback information measured during at least the previous frame k−1), then computing a data transmission schedule for these nodes Ni and transmitting this computed data transmission schedule from the central controller CC to these nodes Ni, during the computation phase, and iii) transmitting data between nodes Ni during time slots associated to these nodes Ni according to the computed data transmission schedule, and measuring, into each node Ni, feedback information relative to the data transmissions, during the data transmission phase.

The invention offers several advantages, amongst which:
it enables identifying and accurately taking into account hidden interferers in an adaptive manner in a centralized multi-hop wireless network,
it allows to integrate an accurate interference estimation method into an optimal transmission scheduling algorithm (or method).

The invention is not limited to the embodiments of data transmission method, processing device, node (or network equipment) and controller described above, only as examples, but it encompasses all alternative embodiments which may be considered by one skilled in the art within the scope of the claims hereafter.

The invention claimed is:

1. A device comprising:
a memory configured to store a conflict graph representative of wireless links between nodes of a wireless multi-hop network that interfere with each other when transmitting simultaneously on a same radio channel at given data rates, the nodes represented in the graph being configured to use a MAC protocol supporting a slotted access;

a processing device configured to:
  generate a data transmission schedule for each multi-slot frame of a data transmission over the multi-hop network, based on the conflict graph in the memory;
  update said conflict graph based on interference information provided by said nodes during said frame; and
  refine the conflict graph based on detected failures of data transmissions that were previously scheduled using the conflict graph.

2. The device according to claim 1, wherein the processing device is further configured to update the conflict graph, the conflict graph further comprising a set of vertices, where each vertex represents a link between two of said nodes transmitting at a given data rate, and a set of edges, where each edge between two vertices represents two links corresponding to these vertices that interfere when they transmit simultaneously on the same channel at corresponding data rates.

3. The device according to claim 1, wherein the interference information comprises a Received Signal Strength measurement.

4. The device according to claim 1, wherein to detect the failures in data transmission the processing device is further configured to analyze packet delivery ratios of links between nodes.

5. The device according to claim 1, wherein the processing device is further configured to:
  update a reachability graph during each frame, the reachability graph comprising a set of vertices, where each vertex corresponds to a network node and each directional edge from a first vertex to a second vertex indicates that said second vertex is within transmission range from said first vertex, from at least said interference information provided by said nodes during each frame; and
  detect hidden interferer nodes among nodes that are at least two-hops away from a receiver node in said reachability graph.

6. The device according to claim 5, wherein the processing device is further configured to:
  update said reachability graph during each frame by computing directional edges; and
  link a first node to a second node when said first node is able to receive chosen packets broadcast by said second node during said frame, based on at least said interference information transmitted by said nodes during said frame.

7. The device according to claim 5, wherein the processing device is further configured to:
  detect, during each frame, a set of hidden interferer nodes from at least feedback information relative to the data transmissions and transmitted by said nodes during at least a previously scheduled frame.

8. The device according to claim 7, wherein the processing device is further configured to:
  label each link associated with a packet delivery ratio equal to zero as a failing link; and
  generate a set of failing links.

9. The device according to claim 8, wherein the processing device is further configure to:
  determine for said set of failing links for which a data transmission failure has been detected, a set of hidden interferer nodes that represent transmitter nodes which are at least a chosen number of hops away from the receiver node of each failing link; and
  add an edge into said conflict graph between each vertex corresponding to a falling link and the vertices whose corresponding links have as transmitter nodes the nodes in said set of hidden interferer nodes.

10. The device according to claim 8, wherein the processing device is further configured to:
  consider for each said failing link a first set of all link transmission sets of the previous frame where this link succeeded and a second set of all the link transmission sets of the previous frame where this link failed; and
  initialize said set of hidden interferer nodes for said failing link by adding only the transmitter nodes of the links that appear in said second set and do not appear in said first set.

11. The device according to claim 10, wherein the processing device is further configured to:
  form a set of hidden interferer nodes by selecting from said initial set of hidden interferer nodes ones that are two-hops away from receiver node of said failing link in said reachability graph; and
  add an edge into said conflict graph between the vertex that corresponds to said failing link and the vertices that correspond to links that have as transmitter nodes the nodes in said set of hidden interferer nodes.

12. The device according to claim 11, wherein the processing device is further configured to:
  if said failing link that failed in the previous frame fails again in a current frame, form a set of hidden interferer nodes for the current frame by selecting from said initial set of hidden interferer nodes ones that are three-hops away from receiver node of said falling link in said reachability graph;
  update said conflict graph by adding an edge between the vertex that corresponds to said failing link and the vertices that correspond to links that have as transmitter nodes the nodes in said set of hidden interferer nodes; and
  if said failing link continues failing in subsequent frames, repeat the forming of a set of hidden interferer nodes and the updating of said conflict graph with an increasing number of hops away from receiver node of said failing link in said reachability graph, until said failing link succeeds in a subsequent frame.

13. A method for transmitting data in a multi-hop wireless network of nodes using a MAC protocol supporting a slotted access, the method comprising:
  generating, using a controller, schedules for transmitting data into multi-slot frames, based on a conflict graph representative of wireless links between nodes that interfere with each other when transmitting simultaneously on a same radio channel using certain data rates;
  measuring, using the controller, chosen interference information from each node;
  receiving, by the controller, from each node, said measured chosen interference information and measured feedback information obtained in a previous frame;
  updating, using the controller, said conflict graph based on the received interference information;
  refining, using the controller, said updated conflict graph from detection of hidden interferer nodes based on detected failures of data transmissions of the links between said nodes deduced from feedback information measured during at least the previous frame;
  computing, using the controller, a data transmission schedule for said nodes; and
  transmitting, using the controller, said computed data transmission schedule from said controller to said nodes.

14. A device comprising:
a memory configured to store a conflict graph representative of wireless links between nodes in a multi-hop wireless network of nodes that interfere with each other when transmitting simultaneously on a same radio channel using certain data rates;
a controller configured to:
  generate schedules for transmitting data into multi-slot frames, based on a conflict graph representative of wireless links between nodes that interfere with each other when transmitting simultaneously on a same radio channel using certain data rates;
  measure chosen interference information from each node;
  receive from each node, said measured chosen interference information and measured feedback information obtained in a previous frame;
  update said conflict graph based on the received interference information;
  refine said updated conflict graph from detection of hidden interferer nodes based on detected failures of data transmissions of the links between said nodes deduced from feedback information measured during at least the previous frame;
  compute a data transmission schedule for said nodes; and
  transmit said computed data transmission schedule from said controller to said nodes.

15. A network device comprising:
a memory;
at least one processor to:
transmit and receive data to and from other nodes in a multi-hop wireless network using a MAC protocol supporting a slotted access;
measure chosen interference information;
transmit to a controller said measured chosen interference information and measured feedback information obtained in a previous frame;
receive a data transmission schedule for transmitting data into multi-slot frames, based on a conflict graph, the conflict graph being representative of wireless links between nodes that interfere with each other when transmitting simultaneously on a same radio channel using certain data rates;
transmit data during associated time slots in accordance with said received data transmission schedule;
measure feedback information relative to said data transmissions; and
refine the conflict graph based on detected failures of data transmissions that were previously scheduled using the conflict graph.

16. A method comprising:
transmitting and receiving, with at least one processor, data to and from other nodes in a multi-hop wireless network using a MAC protocol supporting a slotted access;
measuring, by the at least one processor, chosen interference information;
transmitting, by the at least one processor, to a controller said measured chosen interference information and measured feedback information obtained in a previous frame;
receiving, by the at least one processor, a data transmission schedule for transmitting data into multi-slot frames, based on a conflict graph, the conflict graph being representative of wireless links between nodes that interfere with each other when transmitting simultaneously on a same radio channel using certain data rates;
transmitting, by the at least one processor, data during associated time slots in accordance with said received data transmission schedule;
measuring, by the at least one processor, feedback information relative to said data transmissions; and
refining the conflict graph based on detected failures of data transmissions that were previously scheduled using the conflict graph.

17. A method comprising:
storing, by a processing device, a conflict graph representative of wireless links between nodes of a wireless multi-hop network that interfere with each other when transmitting simultaneously on a same radio channel at given data rates, the nodes represented in the graph being configured to use a MAC protocol supporting a slotted access;
generating, by the processing device, a data transmission schedule for each multi-slot frame of a data transmission over the multi-hop network, based on the conflict graph;
updating, by the processing device, said conflict graph based on interference information provided by said nodes during said frame; and
refining, by the processing device, the conflict graph based on detected failures of data transmissions that were previously scheduled using the conflict graph.

18. The method according to claim 17, further comprising:
updating, by the processing device, the conflict graph, the conflict graph further comprising a set of vertices, where each vertex represents a link between two of said nodes transmitting at a given data rate, and a set of edges, where each edge between two vertices represents two links corresponding to these vertices that interfere when they transmit simultaneously on the same channel at corresponding data rates.

19. The method according to claim 17, wherein the interference information comprises a Received Signal Strength measurement.

20. The method according to claim 17, further comprising analyzing, by the processing device, packet delivery ratios of links between nodes to detect failures in data transmission.

21. The method according to claim 17, further comprising:
updating, by the processing device, a reachability graph during each frame, the reachability graph comprising a set of vertices, where each vertex corresponds to a network node and each directional edge from a first vertex to a second vertex indicates that said second vertex is within transmission range from said first vertex, from at least said interference information provided by said nodes during each frame; and
detecting, by the processing device, hidden interferer nodes among nodes that are at least two-hops away from a receiver node in said reachability graph.

22. The method according to claim 21, further comprising:
updating, by the processing device, said reachability graph during each frame by computing directional edges; and
linking, by the processing device, a first node to a second node when said first node is able to receive chosen packets broadcast by said second node during said frame, based on at least said interference information transmitted by said nodes during said frame.

23. The method according to claim 21, further comprising:
detecting, by the processing device, during each frame, a set of hidden interferer nodes from at least feedback information relative to the data transmissions and transmitted by said nodes during at least a previously scheduled frame.

24. The method according to claim 23, further comprising:
- labeling, by the processing device, each link associated with a packet delivery ratio equal to zero as a failing link; and
- generating, by the processing device, a set of failing links.

25. The method according to claim 24, further comprising:
- determining, by the processing device, for said set of failing links for which a data transmission failure has been detected, a set of hidden interferer nodes that represent transmitter nodes which are at least a chosen number of hops away from the receiver node of each failing link; and
- adding, by the processing device, an edge into said conflict graph between each vertex corresponding to a falling link and the vertices whose corresponding links have as transmitter nodes the nodes in said set of hidden interferer nodes.

26. The method according to claim 24, further comprising:
- considering, by the processing device, for each said failing link a first set of all link transmission sets of the previous frame where this link succeeded and a second set of all the link transmission sets of the previous frame where this link failed; and
- initializing, by the processing device, said set of hidden interferer nodes for said failing link by adding only the transmitter nodes of the links that appear in said second set and do not appear in said first set.

27. The method according to claim 26, further comprising:
- forming, by the processing device, a set of hidden interferer nodes by selecting from said initial set of hidden interferer nodes ones that are two-hops away from receiver node of said failing link in said reachability graph; and
- adding, by the processing device, an edge into said conflict graph between the vertex that corresponds to said failing link and the vertices that correspond to links that have as transmitter nodes the nodes in said set of hidden interferer nodes.

28. The method according to claim 27, further comprising:
- if said failing link that failed in the previous frame fails again in a current frame, forming, by the processing device, a set of hidden interferer nodes for the current frame by selecting from said initial set of hidden interferer nodes ones that are three-hops away from receiver node of said falling link in said reachability graph;
- updating, by the processing device, said conflict graph by adding an edge between the vertex that corresponds to said failing link and the vertices that correspond to links that have as transmitter nodes the nodes in said set of hidden interferer nodes; and
- if said failing link continues failing in subsequent frames, repeating, by the processing device, the forming of a set of hidden interferer nodes and the updating of said conflict graph with an increasing number of hops away from receiver node of said failing link in said reachability graph, until said failing link succeeds in a subsequent frame.

\* \* \* \* \*